US010786765B2

(12) United States Patent
DiLalla et al.

(10) Patent No.: US 10,786,765 B2
(45) Date of Patent: *Sep. 29, 2020

(54) STORM DRAIN SEDIMENT FILTER (71) Applicant: ENPAC, L.L.C., Eastlake, OH (US)

(72) Inventors: Edward L. DiLalla, Aurora, OH (US); Patrick G. Gothro, Chagrin Falls, OH (US); Timothy D. Reed, Northfield Center, OH (US); Scott R. Janda, Chagrin Falls, OH (US); Jay Wiley, Mentor, OH (US)

(73) Assignee: ENPAC, L.L.C., Eastlake, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/532,653

(22) Filed: Aug. 6, 2019

(65) Prior Publication Data
US 2019/0358564 A1    Nov. 28, 2019

Related U.S. Application Data (63) Continuation of application No. 14/464,691, filed on Aug. 20, 2014, now Pat. No. 10,384,155.
(Continued)

(51) Int. Cl.
*B01D 29/27*    (2006.01)
*E03F 5/04*    (2006.01)

(52) U.S. Cl.
CPC ............ *B01D 29/27* (2013.01); *E03F 5/0404* (2013.01)

(58) Field of Classification Search
None
See application file for complete search history.

(56) References Cited

U.S. PATENT DOCUMENTS 497,870 A * 5/1893 Pjelman ................. B65B 67/12
  248/99
530,816 A * 12/1894 Wright ..................... E03F 1/00
  210/247

(Continued)

FOREIGN PATENT DOCUMENTS

JP            11-222915        8/1999

OTHER PUBLICATIONS

U.S. Department of Transportation, "Underground Disposal of Storm Water Runoff, Design Guidelines Manual," Feb. 1980, Table of Contents pp. xiv-xv, pp. 195-196, Appendix E-2 pp. E-2-1-E-2-6.
(Continued)

*Primary Examiner* — Robert J Popovics
(74) *Attorney, Agent, or Firm* — Rankin, Hill & Clark LLP (57) ABSTRACT

A storm drain sediment filter that can be adapted to cover a catch basin and be held in place by a perforated grate. In one embodiment, the filter includes a frame including four L-shaped rigid members, each of which is provided with at least two spaced apart retaining members. The four L-shaped rigid members are arranged such that a rectangular frame is formed having a total of four overlapping sections. The retaining members engage one of the overlapping portions of the frame but slidably receives the other. No retaining ends are formed at the distal end of the slidably engaged L-shaped members to serve as a sliding boundary. Instead, the dimensions of the filter bag are such that the filter bag serves to define the maximum dimension of the frame and thereby maintain the overlapping L-shaped rigid members in slidable engagement with each other. A circular embodiment is also disclosed.

12 Claims, 6 Drawing Sheets

Related U.S. Application Data (60) Provisional application No. 61/868,224, filed on Aug. 21, 2013.

(56) References Cited

U.S. PATENT DOCUMENTS

| | | | | |
|---|---|---|---|---|
| 796,695 A * | 8/1905 | Blake | A41D 13/046 | |
| | | | | 2/52 |
| 840,316 A * | 1/1907 | Gregory | B65B 67/1227 | |
| | | | | 248/100 |
| 868,269 A * | 10/1907 | Hulbert | B65F 1/1415 | |
| | | | | 248/100 |
| 895,759 A * | 8/1908 | Hulbert | B65B 67/1227 | |
| | | | | 248/100 |
| 946,097 A | 1/1910 | Barker | | |
| 1,022,312 A | 4/1912 | Foster et al. | | |
| 1,207,776 A * | 12/1916 | McDonald | B01D 29/15 | |
| | | | | 210/237 |
| 1,310,773 A | 7/1919 | Willis | | |
| 1,470,658 A | 10/1923 | Wall | | |
| 1,652,970 A | 12/1927 | Workman | | |
| 1,659,364 A | 2/1928 | Kelley | E03F 5/046 | |
| | | | | 404/4 |
| 1,664,658 A | 4/1928 | Blazer | B01D 29/27 | |
| | | | | 248/101 |
| 1,728,381 A * | 9/1929 | Waters | A47J 31/446 | |
| | | | | 99/319 |
| 1,746,121 A * | 2/1930 | Levy | E03F 5/14 | |
| | | | | 210/237 |
| 1,961,947 A | 6/1934 | Sieling | | |
| 2,017,539 A | 10/1935 | Kaplan | | |
| 2,102,310 A * | 12/1937 | Egan | E03F 5/0401 | |
| | | | | 210/497.3 |
| 2,113,153 A * | 4/1938 | Jonassen | B65B 67/1244 | |
| | | | | 248/101 |
| 2,414,487 A * | 1/1947 | Schuttler | B07B 1/50 | |
| | | | | 210/359 |
| 2,423,325 A * | 7/1947 | Jones | B65B 67/12 | |
| | | | | 248/100 |
| 2,496,757 A | 2/1950 | Sieling | | |
| 2,615,526 A | 10/1952 | Lane | E03F 5/0404 | |
| | | | | 188/153 R |
| 2,632,934 A | 3/1953 | Thompson | B65D 45/32 | |
| | | | | 24/20 R |
| 3,014,482 A * | 12/1961 | Case | A61F 13/64 | |
| | | | | 604/402 |
| 3,282,430 A | 11/1966 | Kinne | | |
| 3,532,314 A * | 10/1970 | Vosbikian | B65B 67/1205 | |
| | | | | 248/97 |
| 3,627,243 A * | 12/1971 | Farrelli | B65B 67/12 | |
| | | | | 248/99 |
| 3,713,539 A | 1/1973 | Thompson et al. | | |
| 3,817,434 A | 6/1974 | Dickman | B60N 3/08 | |
| | | | | 224/275 |
| 3,866,872 A | 2/1975 | Burgess | B65B 67/12 | |
| | | | | 248/97 |
| 3,916,962 A | 11/1975 | Stolt | B65B 67/1233 | |
| | | | | 141/108 |
| 3,977,450 A * | 8/1976 | Schampier | A47G 29/06 | |
| | | | | 383/7 |
| 4,006,928 A * | 2/1977 | Beugin | B65B 67/1238 | |
| | | | | 248/101 |
| 4,026,340 A * | 5/1977 | Sobolik | B65D 33/007 | |
| | | | | 383/33 |
| 4,406,042 A * | 9/1983 | McPhee | A61M 5/1418 | |
| | | | | 24/129 A |
| 4,419,232 A | 12/1983 | Arntyr et al. | | |
| 4,762,297 A * | 8/1988 | Milligan | B65B 67/1227 | |
| | | | | 248/100 |
| 4,867,401 A * | 9/1989 | Graff | B65B 67/12 | |
| | | | | 248/99 |
| 4,934,637 A * | 6/1990 | Guerrera | B65B 67/12 | |
| | | | | 248/100 |
| 5,037,541 A | 8/1991 | Ruey-Jang | E03F 5/06 | |
| | | | | 210/141 |
| 5,082,219 A * | 1/1992 | Blair | B65F 1/1415 | |
| | | | | 141/390 |
| 5,125,605 A * | 6/1992 | Guerrera | B65B 67/12 | |
| | | | | 248/100 |
| 5,222,704 A * | 6/1993 | Light | B65F 1/06 | |
| | | | | 220/495.08 |
| 5,232,587 A | 8/1993 | Hegemier | B01D 29/111 | |
| | | | | 210/162 |
| 5,284,580 A | 2/1994 | Shyh | B01D 29/117 | |
| | | | | 210/163 |
| 5,310,078 A | 5/1994 | Strawder | B65F 1/06 | |
| | | | | 220/254.2 |
| D353,696 S * | 12/1994 | Spencer | D34/10 | |
| 5,372,714 A | 12/1994 | Logue, Jr. | | |
| 5,403,474 A | 4/1995 | Emery | E03F 1/00 | |
| | | | | 210/163 |
| 5,575,925 A | 11/1996 | Logue, Jr. | | |
| 5,587,072 A * | 12/1996 | Regan | B01D 29/117 | |
| | | | | 210/232 |
| 5,588,622 A * | 12/1996 | Gordon, Sr. | B65B 67/1238 | |
| | | | | 24/30.5 R |
| 5,636,871 A * | 6/1997 | Field | B63B 25/002 | |
| | | | | 114/361 |
| D386,867 S * | 11/1997 | Clark | D2/627 | |
| 5,733,445 A | 3/1998 | Fanelli | | |
| 5,743,651 A * | 4/1998 | Steinmetz | B65B 67/12 | |
| | | | | 15/257.1 |
| 5,772,882 A | 6/1998 | Chang | B01D 35/04 | |
| | | | | 210/460 |
| 5,788,849 A | 8/1998 | Hutter, Jr. | B01D 15/00 | |
| | | | | 210/163 |
| 5,820,762 A | 10/1998 | Bamer | B01D 17/0202 | |
| | | | | 210/661 |
| 5,849,198 A | 12/1998 | Sharpless | C02F 1/285 | |
| | | | | 210/693 |
| 5,904,842 A | 5/1999 | Billias | E03F 5/0401 | |
| | | | | 210/162 |
| 5,954,952 A | 9/1999 | Strawser, Sr. | | |
| 5,980,740 A | 11/1999 | Harms | B01D 29/15 | |
| | | | | 210/162 |
| 6,010,622 A | 1/2000 | Chinn et al. | | |
| 6,045,691 A | 4/2000 | McDermott | | |
| 6,059,964 A | 5/2000 | Strawser, Sr. | | |
| 6,086,758 A | 7/2000 | Schilling et al. | | |
| 6,093,314 A | 7/2000 | Wilson et al. | | |
| 6,099,723 A | 8/2000 | Morris | B01D 17/0202 | |
| | | | | 210/170.03 |
| 6,135,293 A * | 10/2000 | Herbst | B01D 29/824 | |
| | | | | 210/351 |
| 6,149,803 A * | 11/2000 | DiLoreto, Jr. | B01D 29/03 | |
| | | | | 210/164 |
| 6,178,565 B1 | 1/2001 | Franco | E03F 1/00 | |
| | | | | 210/163 |
| 6,214,216 B1 | 4/2001 | Isaacson | | |
| 6,221,243 B1 | 4/2001 | Flanagan | B01D 17/0202 | |
| | | | | 210/163 |
| 6,231,758 B1 | 5/2001 | Morris | B01D 17/00 | |
| | | | | 210/163 |
| 6,270,663 B1 | 8/2001 | Happel | B01D 17/00 | |
| | | | | 210/163 |
| 6,274,036 B1 * | 8/2001 | Ellis | B01D 29/27 | |
| | | | | 210/164 |
| 6,294,095 B1 | 9/2001 | Lewis | | |
| D449,912 S * | 10/2001 | Henriksson | D34/6 | |
| 6,306,293 B1 * | 10/2001 | Schilling | B01D 29/23 | |
| | | | | 210/164 |
| 6,334,953 B1 | 1/2002 | Singleton | B01D 29/27 | |
| | | | | 210/232 |
| 6,367,822 B1 * | 4/2002 | Hutchins | B62B 1/10 | |
| | | | | 248/99 |
| 6,368,499 B1 | 4/2002 | Sharpless | E03F 1/00 | |
| | | | | 210/164 |
| 6,517,034 B1 * | 2/2003 | Kinchen | B65B 67/1238 | |
| | | | | 248/100 |

(56) References Cited

U.S. PATENT DOCUMENTS

| | | | | |
|---|---|---|---|---|
| 6,517,709 B1* | 2/2003 | Cardwell | B01D 29/27 | 210/164 |
| 6,521,122 B1* | 2/2003 | Elliot | E03F 1/00 | 210/163 |
| 6,531,059 B1* | 3/2003 | Morris | B01D 29/012 | 210/164 |
| 6,537,446 B1 | 3/2003 | Sanguinetti | E03F 1/00 | 210/163 |
| 6,551,023 B2* | 4/2003 | Allard | B01D 35/05 | 405/36 |
| 6,554,997 B1* | 4/2003 | Schilling | B01D 29/23 | 210/164 |
| 6,562,233 B1* | 5/2003 | Schilling | B01D 29/23 | 210/164 |
| 6,666,974 B2* | 12/2003 | Page | E03F 1/00 | 210/164 |
| 6,691,959 B1* | 2/2004 | Dancy | B65B 67/1205 | 248/100 |
| 6,726,402 B1 | 4/2004 | Martinez | E03F 1/00 | 405/40 |
| 6,749,746 B2* | 6/2004 | Mokrzycki | B01D 29/27 | 210/163 |
| 6,767,456 B2 | 7/2004 | Middleton | B01J 20/20 | 210/156 |
| 6,805,804 B2 | 10/2004 | Page | | |
| 6,872,029 B2* | 3/2005 | Allard | B01D 29/27 | 405/36 |
| 6,875,345 B2* | 4/2005 | Hannah | B01D 29/27 | 210/154 |
| 6,884,343 B2* | 4/2005 | Harris | B01D 29/014 | 210/163 |
| 6,908,549 B2 | 6/2005 | Middleton | B01J 20/20 | 210/164 |
| 6,976,808 B2* | 12/2005 | Allard | B01D 35/30 | 405/36 |
| 6,986,621 B2* | 1/2006 | Allard | B01D 29/27 | 405/36 |
| 6,998,039 B2* | 2/2006 | Harris | B01D 29/27 | 210/164 |
| 7,014,755 B2 | 3/2006 | Muir | B01D 24/008 | 210/164 |
| 7,040,838 B2* | 5/2006 | Allard | B01D 29/27 | 405/36 |
| 7,094,338 B2* | 8/2006 | Morris | B01D 29/012 | 210/163 |
| 7,112,274 B1* | 9/2006 | Sanguinetti | B01D 29/01 | 210/163 |
| 7,128,832 B2 | 10/2006 | Wade | B01D 29/23 | 210/155 |
| 7,156,987 B1* | 1/2007 | Sanguinetti | E03F 1/00 | 210/164 |
| 7,178,675 B2 | 2/2007 | Votel | A47L 17/02 | 210/232 |
| 7,186,333 B2* | 3/2007 | Kluge | E03F 1/00 | 210/164 |
| 7,201,843 B2 | 4/2007 | Sasaki et al. | | |
| 7,485,218 B2* | 2/2009 | Dussich, I | E03F 5/0404 | 210/164 |
| 7,524,414 B1* | 4/2009 | Barragan | E03F 1/00 | 210/163 |
| 7,540,953 B2 | 6/2009 | Fitzgerald | E03F 5/0404 | 210/162 |
| 7,658,857 B2* | 2/2010 | Wacome | E03F 5/0401 | 210/747.3 |
| 7,670,483 B2* | 3/2010 | Ringenbach | E03F 1/00 | 210/163 |
| 7,771,591 B2* | 8/2010 | Lucas | E03F 1/00 | 210/163 |
| 7,837,869 B2 | 11/2010 | Peters, Jr. | B01D 39/083 | 210/164 |
| D629,803 S* | 12/2010 | St. Ives | D14/396 | |
| 7,959,799 B2* | 6/2011 | Happel | B01D 21/0012 | 210/163 |
| 7,981,300 B2* | 7/2011 | Wacome | E03F 5/0401 | 210/747.3 |
| 8,012,346 B2* | 9/2011 | Peters, Jr. | C02F 1/28 | 210/170.03 |
| 8,017,005 B2* | 9/2011 | Ringenbach | E03F 1/00 | 210/163 |
| 8,051,568 B2* | 11/2011 | Moody | E03F 5/0404 | 29/896.62 |
| 8,177,270 B2* | 5/2012 | Chen | A01K 23/005 | 294/1.5 |
| 8,216,453 B2* | 7/2012 | Moody | E03F 1/00 | 210/163 |
| 8,221,632 B2* | 7/2012 | McInnis | E03F 5/0404 | 210/747.3 |
| 8,226,824 B2 | 7/2012 | Mondschein | E03F 5/06 | 210/131 |
| 8,475,655 B2* | 7/2013 | Sasaki | E03F 5/0404 | 210/162 |
| 8,486,260 B2 | 7/2013 | Tripodi | E03F 5/0407 | 210/164 |
| 8,501,016 B2 | 8/2013 | Lord | B01D 35/02 | 210/155 |
| 8,608,956 B2* | 12/2013 | Moulton | E03F 5/0403 | 210/163 |
| 8,652,323 B2* | 2/2014 | Dorsey | E03F 1/00 | 210/164 |
| 8,679,328 B2 | 3/2014 | Hebert | E03F 5/0404 | 210/163 |
| 8,679,329 B2* | 3/2014 | Vreeland | B01D 23/04 | 210/164 |
| 8,715,491 B2* | 5/2014 | Shaw | E03F 5/041 | 210/85 |
| 8,906,232 B2* | 12/2014 | McInnis | E03F 5/14 | 210/163 |
| 8,980,084 B2* | 3/2015 | Dorsey | E03F 5/06 | 210/163 |
| 9,051,192 B2* | 6/2015 | Kent | C02F 1/004 | |
| D739,656 S* | 9/2015 | Krotts | D3/305 | |
| 9,194,116 B2* | 11/2015 | Bailey | E03F 5/0404 | |
| 9,296,021 B2* | 3/2016 | Moulton | B08B 17/025 | |
| 9,512,608 B2* | 12/2016 | Al-Assfour | E03F 5/0404 | |
| 9,624,658 B2* | 4/2017 | Hannah | E03F 5/0404 | |
| 9,663,964 B2* | 5/2017 | Kurani | E04H 4/1209 | |
| 9,719,240 B1* | 8/2017 | Montague | E03F 5/0404 | |
| 10,384,155 B1* | 8/2019 | DiLalla | B01D 29/27 | |
| 10,422,119 B2* | 9/2019 | Coppola | E03F 5/0404 | |
| 10,465,371 B2* | 11/2019 | Wacome | E03F 5/106 | |
| 10,508,430 B2* | 12/2019 | Riley | E03F 5/14 | |
| 10,655,330 B2* | 5/2020 | Keshet | E04D 11/005 | |
| 10,661,204 B2* | 5/2020 | Dobak | B01D 29/11 | |
| 10,704,247 B2* | 7/2020 | Zock | B01D 39/1676 | |
| 10,724,224 B2* | 7/2020 | Deurloo | E03F 5/042 | |
| 2002/0020658 A1 | 2/2002 | Isaacson | E03F 1/00 | 210/162 |
| 2002/0048490 A1* | 4/2002 | Allard | E03F 5/0404 | 405/43 |
| 2002/0071722 A1* | 6/2002 | Allard | B01D 29/902 | 405/43 |
| 2002/0096461 A1* | 7/2002 | Harris | E03F 1/00 | 210/162 |
| 2002/0104789 A1* | 8/2002 | Harris | E03F 1/00 | 210/162 |
| 2002/0113025 A1* | 8/2002 | Gauldin | E03F 5/0404 | 210/767 |
| 2002/0121466 A1* | 9/2002 | McDermott | B01D 17/00 | 210/164 |
| 2002/0130070 A1 | 9/2002 | Roesner | E03F 5/0401 | 210/163 |
| 2002/0130083 A1 | 9/2002 | Middleton | B01J 20/20 | 210/660 |
| 2002/0159838 A1* | 10/2002 | Allard | B01D 35/05 | 405/43 |
| 2002/0164209 A1* | 11/2002 | Allard | E03F 5/0401 | 405/36 |

(56) References Cited

U.S. PATENT DOCUMENTS

| | | | |
|---|---|---|---|
| 2003/0047497 A1* | 3/2003 | Harris | E03F 5/0404 210/163 |
| 2003/0070980 A1* | 4/2003 | Ray | B01D 29/27 210/489 |
| 2003/0098267 A1* | 5/2003 | Page | E03F 1/00 210/164 |
| 2003/0127380 A1 | 7/2003 | Morris | B01D 29/012 210/164 |
| 2003/0141230 A1* | 7/2003 | Mokrzycki | B01D 36/04 210/163 |
| 2003/0183569 A1* | 10/2003 | Hannah | B01D 29/27 210/236 |
| 2004/0007522 A1* | 1/2004 | Garti | B01D 29/27 210/483 |
| 2004/0011731 A1* | 1/2004 | Sanguinetti | E03F 1/00 210/483 |
| 2004/0016692 A1* | 1/2004 | Sasaki | B01D 29/27 210/473 |
| 2004/0040901 A1 | 3/2004 | Page | B01D 17/00 210/163 |
| 2004/0128903 A1 | 7/2004 | Wexler | A01M 1/106 43/122 |
| 2004/0232057 A1 | 11/2004 | Orozco | B01D 29/15 210/86 |
| 2005/0000872 A1 | 1/2005 | Middleton | B01J 20/20 210/163 |
| 2005/0067338 A1 | 3/2005 | Page | E03F 1/00 210/164 |
| 2005/0103951 A1* | 5/2005 | Metcalfe | B65B 67/1238 248/99 |
| 2005/0183997 A1* | 8/2005 | Happel | B01D 21/0012 210/163 |
| 2005/0199537 A1 | 9/2005 | Kluge | E03F 1/00 210/164 |
| 2005/0230302 A1 | 10/2005 | Muir | B01D 24/008 210/290 |
| 2005/0230317 A1 | 10/2005 | Belasco | E03F 1/00 210/691 |
| 2005/0247612 A1 | 11/2005 | Glassheim | E03F 1/00 210/163 |
| 2006/0049085 A1 | 3/2006 | Parker | E03F 1/00 210/163 |
| 2006/0102543 A1* | 5/2006 | Peters, Jr. | E03F 1/00 210/170.03 |
| 2006/0207922 A1* | 9/2006 | Dussich | E03F 1/00 210/164 |
| 2008/0179229 A1* | 7/2008 | Dorsey | E03F 5/0404 210/163 |
| 2008/0290042 A1 | 11/2008 | Hanson | E03F 1/00 210/747.3 |
| 2009/0014370 A1 | 1/2009 | Peters, Jr. | B01D 39/083 210/164 |
| 2009/0101553 A1 | 4/2009 | Lucas | E03F 1/00 210/164 |
| 2009/0107899 A1 | 4/2009 | Ringenbach | E03F 1/00 210/164 |
| 2009/0173699 A1* | 7/2009 | Wacome | E03F 5/0404 210/747.3 |
| 2010/0108839 A1 | 5/2010 | Ringenbach | E03F 1/00 248/225.11 |
| 2010/0133201 A1 | 6/2010 | Wacome | E03F 5/0404 210/747.3 |
| 2011/0155672 A1* | 6/2011 | McInnis | E03F 5/0404 210/747.3 |
| 2011/0192775 A1* | 8/2011 | Shaw | E03F 5/0401 210/170.03 |
| 2011/0278237 A1* | 11/2011 | McInnis | E03F 5/14 210/767 |
| 2011/0284442 A1 | 11/2011 | Williams | B01D 29/27 210/170.09 |
| 2011/0290967 A1 | 12/2011 | Ringenbach | E03F 1/00 248/220.1 |
| 2012/0043266 A1* | 2/2012 | Moody | E03F 5/0404 210/163 |
| 2012/0074048 A1 | 3/2012 | Glassheim | C02F 1/004 210/165 |
| 2012/0145612 A1* | 6/2012 | McInnis | E03F 5/0404 210/163 |
| 2012/0217205 A1 | 8/2012 | Lord | B01D 35/02 210/747.3 |
| 2012/0222995 A1* | 9/2012 | Sasaki | E03F 5/0404 210/163 |
| 2013/0008851 A1 | 1/2013 | Jarvis, Jr. | E03F 5/0404 210/499 |
| 2013/0020242 A1* | 1/2013 | Vreeland | E03F 5/0404 210/163 |
| 2013/0056399 A1* | 3/2013 | Downare | C02F 1/004 210/170.03 |
| 2013/0087492 A1* | 4/2013 | Lea | B01D 29/27 210/241 |
| 2013/0118963 A1* | 5/2013 | Bailey | E03F 5/0404 210/164 |
| 2013/0186811 A1* | 7/2013 | Kaiser | E03F 5/0404 210/163 |
| 2013/0264256 A1 | 10/2013 | Hebert | E03F 5/0404 210/163 |
| 2013/0292317 A1* | 11/2013 | Shaw | E03F 5/0404 210/266 |
| 2013/0299402 A1* | 11/2013 | Rogahn | E03F 5/0404 210/163 |
| 2013/0313205 A1 | 11/2013 | Lord | B01D 35/02 210/747.3 |
| 2014/0027362 A1 | 1/2014 | Kent | E03F 5/0404 210/170.03 |
| 2014/0054236 A1 | 2/2014 | Bennett | E03B 7/095 210/747.3 |
| 2014/0124422 A1* | 5/2014 | Dorsey | E03F 5/046 210/163 |
| 2014/0224238 A1 | 8/2014 | Moulton | B08B 3/02 126/16 |
| 2014/0238915 A1 | 8/2014 | McInnis | E03F 5/0404 210/170.03 |
| 2014/0374332 A1 | 12/2014 | Hannah | E03F 5/0404 210/170.03 |
| 2015/0354242 A1 | 12/2015 | Saccoccio | E04H 4/12 210/806 |
| 2016/0256804 A1* | 9/2016 | Medeiros | A47J 43/24 |
| 2016/0289947 A1* | 10/2016 | Al-Assfour | E03F 5/0404 |
| 2017/0130889 A1* | 5/2017 | Honeyball | F16L 55/115 |
| 2017/0136392 A1* | 5/2017 | Perry | C02F 1/001 |
| 2017/0145677 A1* | 5/2017 | Coppola | C02F 1/001 |
| 2017/0284077 A1 | 10/2017 | Deurloo | B01D 29/94 |
| 2017/0314223 A1* | 11/2017 | Keshet | E04D 11/005 |
| 2018/0023280 A1* | 1/2018 | Hannah | A01G 9/026 210/170.03 |
| 2018/0023281 A1* | 1/2018 | Coppola | E03F 5/16 210/163 |
| 2018/0023282 A1* | 1/2018 | Coppola | C02F 1/004 210/163 |
| 2018/0071661 A1* | 3/2018 | Dobak | B01D 29/27 |
| 2018/0112386 A1* | 4/2018 | Coppola | B01D 29/27 |
| 2019/0153719 A1* | 5/2019 | McInnis | E03F 5/0404 |
| 2019/0203457 A1* | 7/2019 | Peters, Jr. | E03F 5/106 |
| 2019/0226193 A1* | 7/2019 | Deurloo | B01D 29/27 |
| 2019/0292766 A1* | 9/2019 | Riley | B01D 29/23 |
| 2019/0358564 A1* | 11/2019 | DiLalla | B01D 29/27 |

OTHER PUBLICATIONS

List of References included with Notice of Allowance dated Jun. 27, 2019 in U.S. Appl. No. 14/464,691.

* cited by examiner

STORM DRAIN SEDIMENT FILTER

CROSS-REFERENCE TO RELATED APPLICATIONS

This application is a continuation of U.S. application Ser. No. 14/464,691, filed Aug. 20, 2014, now U.S. Pat. No. 10,384,155 B2, and claims priority to U.S. provisional App. Ser. No. 61/868,224, filed Aug. 21, 2013.

BACKGROUND OF INVENTION

Field of Invention

The present invention relates to.
This invention relates to a storm drain sediment filter configured to span an opening of a catch basin.

Description of Related Art

Sasaki et al., U.S. Pat. No. 7,201,843, discloses a storm drain sediment filter that includes an adjustable frame from which a filter including a collar and a filter bag is suspended. In a rectangular embodiment, the length and width dimensions of the frame of the storm drain sediment filter according to Sasaki et al. can be adjusted to accommodate catch basins of various dimensions. In use, the length and width dimensions of the frame are adjusted such that the frame can be captured between a perforated storm grate and a recessed ledge of a catch basin on which the storm grate rests. Storm water passes through the filter material, and sediment flowing with the storm water is captured on the collar and/or in the filter bag.

Figure 6A:
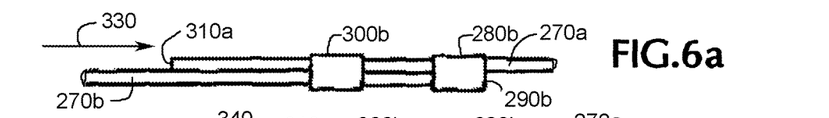
FIGS. 6a and 6b illustrate the preferred configuration of the retaining members, which allow for adjustment of the dimensions of the storm drain sediment filter in extended and contracted positions, respectively.
Figures 6B, 7, 8:
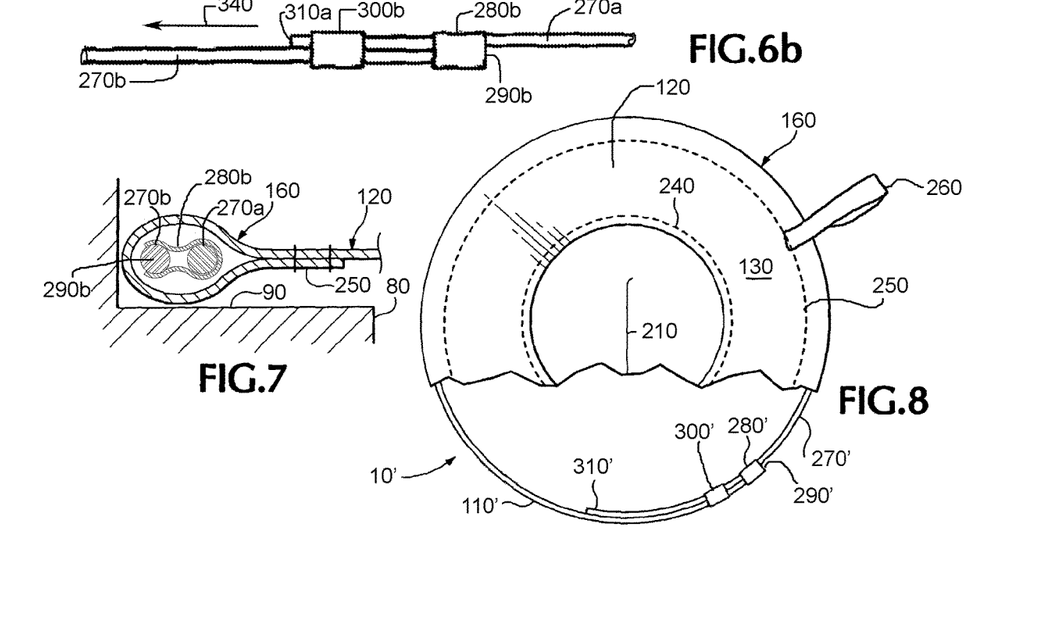
FIG. 7 is a schematic sectional view of an exemplary retaining member as shown in FIGS. 6a and 6b as installed within the filter and resting on the recess of the catch basin.
FIG. 8 is a top plan view in partial cutaway of a storm drain sediment filter constructed according to a second embodiment of the invention for use with circular catch basin inlets.

Sasaki et al. teach that the frame comprises four L-shaped rigid members, each of which is provided with a retaining member. The four L-shaped rigid members are arranged such that a rectangular frame is formed having a total of four overlapping sections. The overlapping portions of the frame are slidably engaged by means of the retaining member, which is joined to one of the rigid members but slidably receives the other. To prevent the separation of the L-shaped rigid members when the dimensions of the filter are adjusted, Sasaki et al. teach that retaining ends are formed at the distal end of the slidably engaged L-shaped members. The retaining ends serve as a sliding boundary that cannot be withdrawn through the retaining members. Sasaki et al. teach that the retaining ends can be formed by flattening (i.e., deforming) the distal ends of the slidably movable rigid members such as shown in FIGS. 6a and 6b of Sasaki et al. (see element 80 in such figures). It is also known that one can form retaining ends by bending the distal ends of the slidably engaged L-shaped members such that they cannot be withdrawn through the retaining members.

The storm drain sediment filter according to Sasaki et al. is superior, in many respects, to other storm drain sediment filter devices presently available in the market. But there is a need for improvement. In particular, the presence of retaining ends on the distal ends of the L-shaped members is prone to damage the filter suspended from the frame during use. This is particularly problematic when the filter is formed of geotextile fabrics.

BRIEF SUMMARY OF THE INVENTION

In view of the foregoing, the present invention is directed toward an improved storm drain sediment filter that is configured to span an opening of a catch basin and which can be retained, at least in part, by a perforated grate for the catch basin. In one embodiment, a storm drain sediment filter according to the invention comprises a frame comprised of four L-shaped rigid members, each of which is provided with at least two spaced apart retaining members. The four L-shaped rigid members are arranged such that a rectangular frame is formed having a total of four overlapping sections. The overlapping portions of the frame are slidably engaged using at least two spaced apart retaining members per side, which are joined to one of the rigid members but slidably receive the other. However, no retaining ends are formed at the distal end of the slidably engaged L-shaped members. Instead, the dimensions of the filter that receive the frame are limited such that the filter serves to define the maximum dimension of frame expansion, which thereby maintains the overlapping L-shaped rigid members in slidable engagement with each other (i.e., the filter prevents withdrawal of the slidably engaged L-shaped members from the retaining members). The omission of retaining ends prevents the retaining ends from damaging the filter material, which is particularly useful when geotextile fabrics are used. In another embodiment of the invention, the frame is circular and includes two spaced apart retaining members and a slidably received frame portion that does not include a retaining end. Again, the dimensions of the filter serve to define the maximum dimension of frame expansion.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

Figure 1:
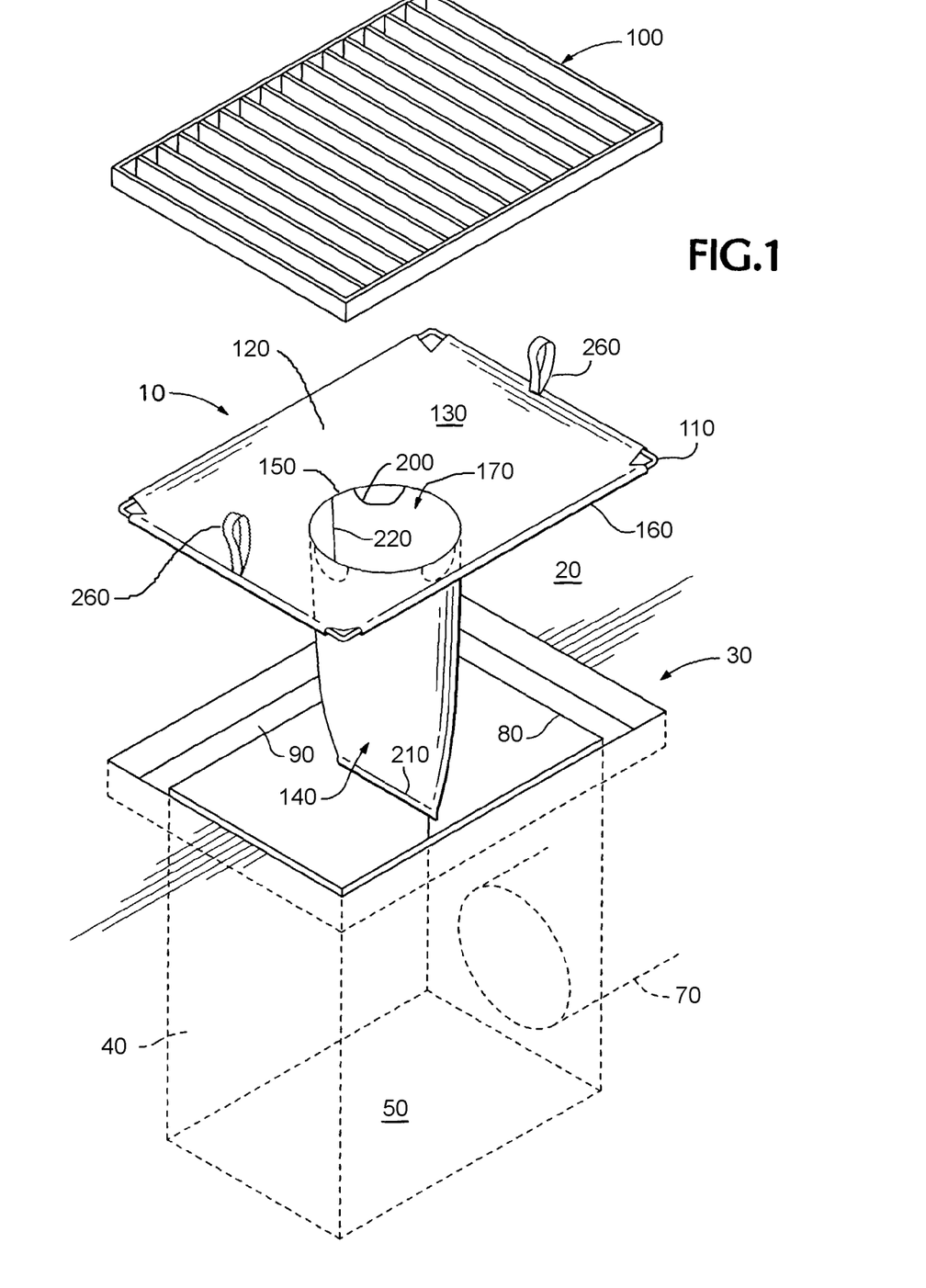
FIG. 1 is a perspective view of a storm drain sediment filter constructed and installed according to a preferred embodiment of the invention shown in exploded view.

A storm drain sediment filter constructed according to a preferred embodiment of the invention is shown generally at 10 in FIG. 1. Storm drain sediment filter 10 is intended to be installed within a below-grade 20 catch basin 30 of a type having basin sidewalls 40 and floor 50 defining a chamber 60. A sewer pipe 70 extends away from one of the sidewalls 40 a distance above the floor 50. There would typically be four sidewalls for a rectangular chamber and one continuous sidewall for a cylindrical chamber. The catch basin 30 includes an upper end defining a catch basin inlet 80 and a recess 90 located at the upper end into which a grate 100 is normally received.

Figure 2:
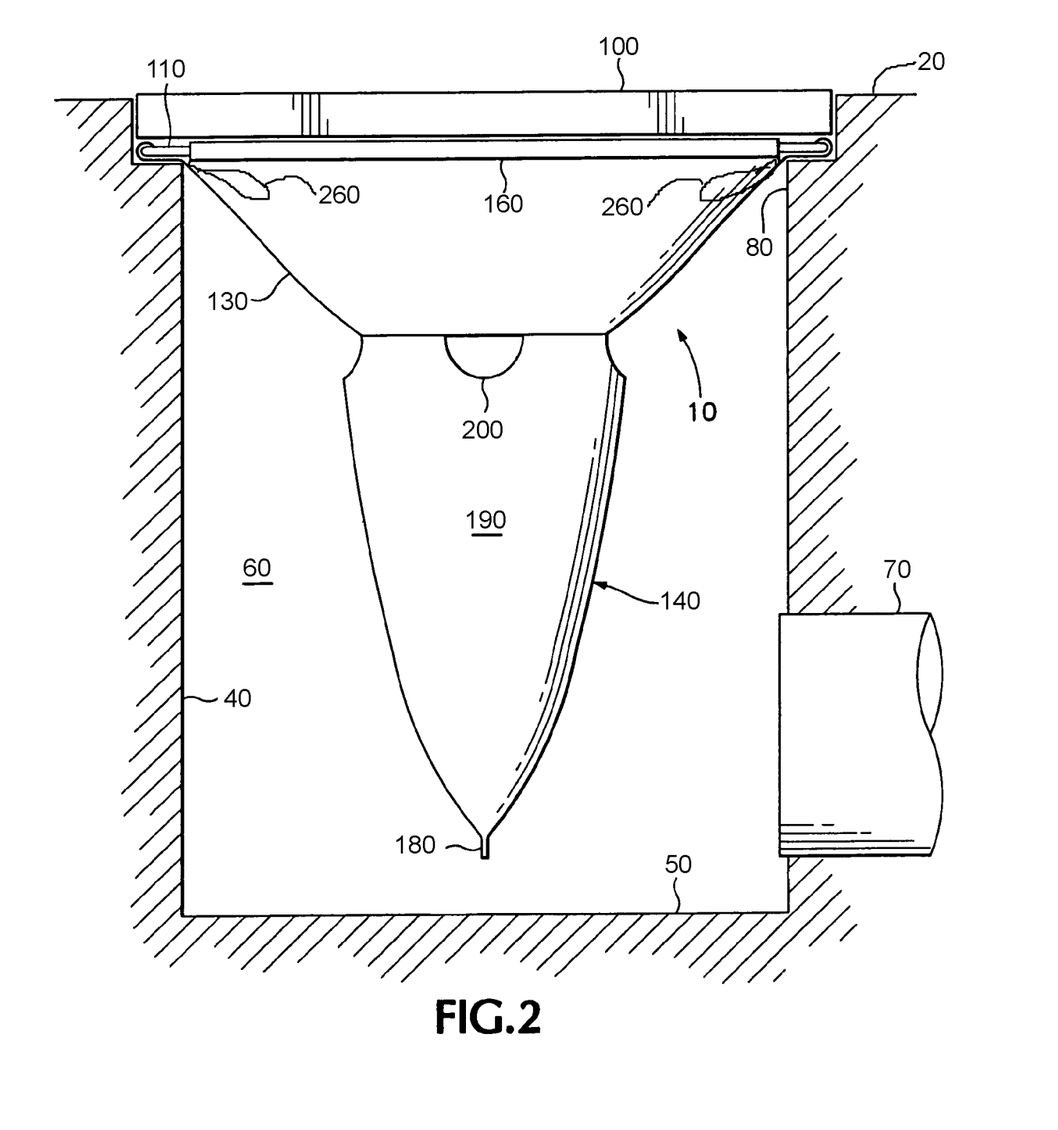
FIG. 2 is a side sectional view of the preferred embodiment of the invention shown in FIG. 1 (non-exploded view).
Figure 3:
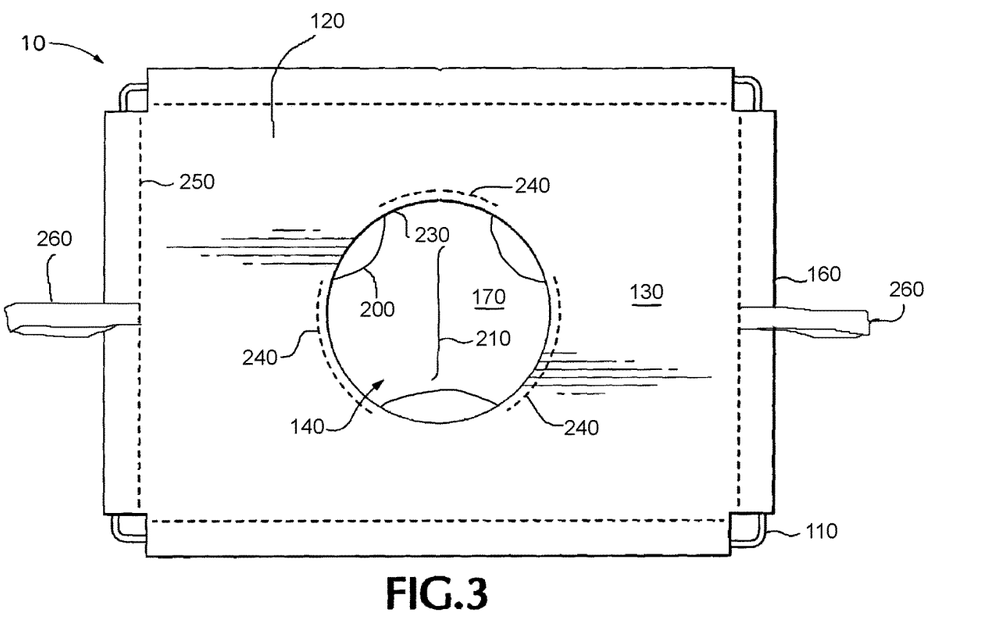
FIG. 3 is a top plan view of the storm drain sediment filter shown in FIG. 1.

As shown also in FIGS. 2 and 3, storm drain sediment filter 10 includes a two-dimensional support frame 110 adapted to be received within and rest upon recess 90 of catch basin 30 and beneath grate 100. As the catch basin inlet 80 has a rectangular opening into catch basin chamber 60, frame 110 must be similarly rectangular and sized with a length and width for placement on a horizontal surface of recess 90.

Figure 13:
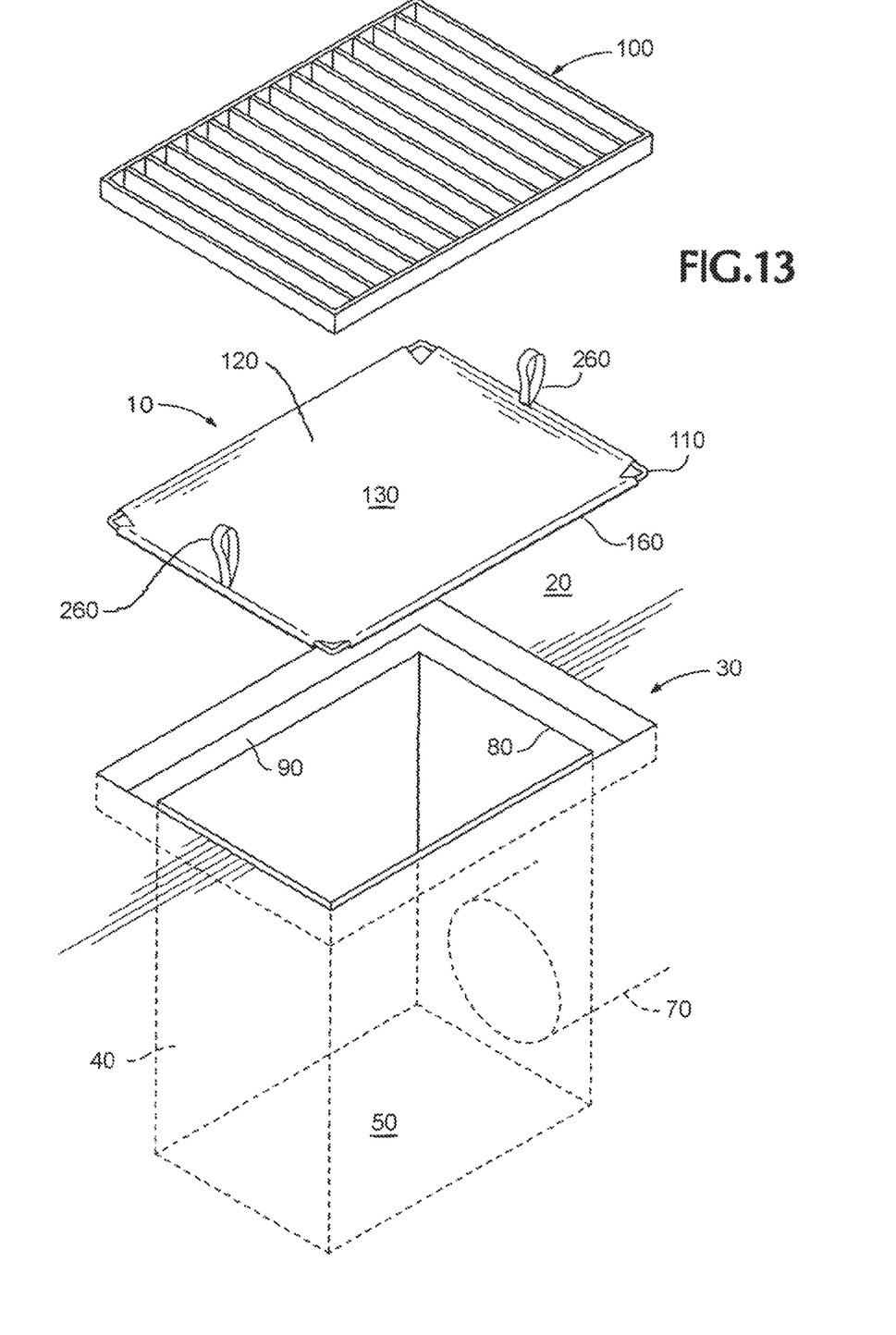
FIG. 13 is a perspective view of a storm drain sediment filter constructed and installed according to another embodiment of the invention shown in exploded view.

The storm drain sediment filter 10 further includes a filter 120 that comprises a portion 130 and, preferably, a filter bag 140 that is stitched to an opening 150 in the portion 130 (FIG. 13 shows an embodiment that does not include a filter bag 140). The filter 120 can be made of any fabric capable of filtering sediment from storm water. The fabric may be woven or non-woven. A non-woven geotextile fabric is presently preferred. The filter 120 is coupled to the support frame 110 via loops 160 sewn in the fabric of the filter 120 (see, e.g., FIG. 7).

Filter bag 140 has an open top 170, closed bottom 180 and bag sidewall 190, and is adapted to be positioned at the catch basin inlet 80 and suspended within catch basin chamber 60. In some embodiments, filter bag 140 includes overflow apertures 200 located at a top portion of the bag sidewall 190 to allow excess (unfiltered) water to exit the filter bag 140 and into the catch basin during periods of heavy flow. In other embodiments, no overflow apertures 200 are included in the bag sidewall 190. It will be appreciated that the number and style of overflow apertures can be varied.

Figure 9:
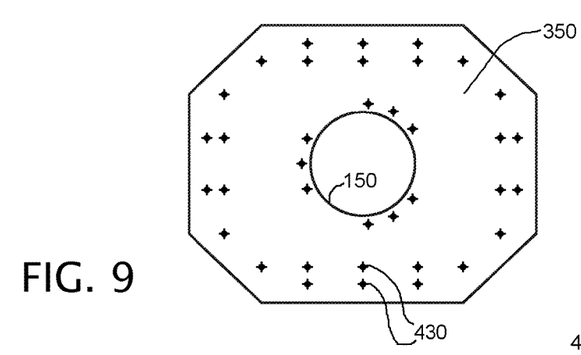
FIG. 9 is a top plan view of a section of geotextile fabric as cut out and marked for use in forming a portion of a filter according to one embodiment of the invention.
Figure 10:
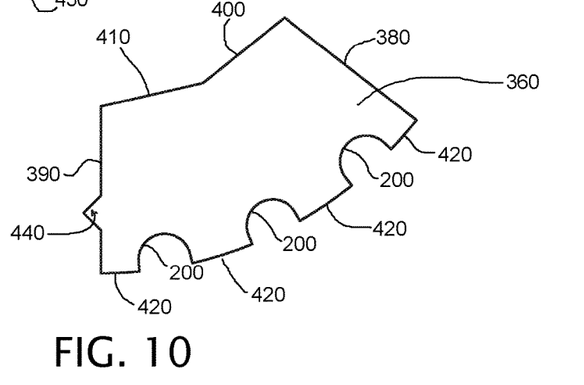
FIG. 10 is a top plan view of a section of geotextile fabric as cut out for use in forming a first embodiment of a filter bag portion of a filter.
Figures 11, 12:
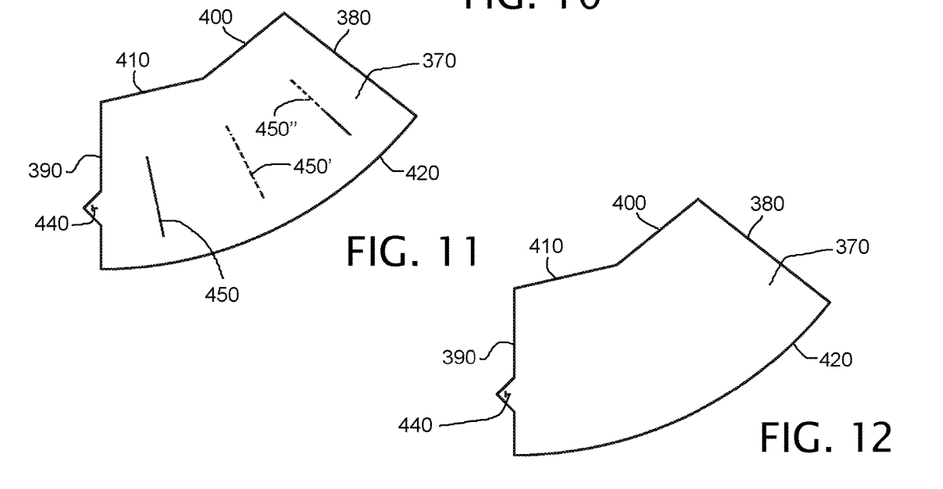
FIG. 11 is a top plan view of a section of geotextile fabric as cut out for use in forming a second embodiment of a filter bag portion of a filter.
FIG. 12 is a top plan view of a section of geotextile fabric as cut out for use in forming a third embodiment of a filter bag portion of a filter.

The filter bag 140 is preferably formed of a single piece of geotextile nonwoven fabric, which has been cut such as shown in FIG. 10 or 11 and stitched to form a filter bag 140 having a single bag sidewall 190, a closed bottom 180 and a round open top 170. The closed bottom 180 of the filter bag 140 is formed via a bottom seam 210, and the continuous single bag sidewall 190 is formed via a side seam 220. A single piece of the same geotextile fabric used to form the filter bag 140 is also used to form the portion 130. As shown in FIG. 9, a centrally located circular cutout 230 is formed in portion 130, and the topmost portion of the filter bag 140 (i.e., the portion at the open top 170) is stitched to the portion 130 at the circular cutout 230 via seams 240 so that the filter bag 140 is inserted within the cutout 230 and drops below the level of the portion 130. Material along the periphery of the portion 130 is folded back and affixed via seam 250 to the portion to form the loops 160 through which the 110 frame is received. The filter bag 140 is preferably made of the same material as the portion 130, but could be made of a different fabric material, if desired.

Lifting straps 260 are preferably stitched into the portion 130 at opposite sides. The lifting straps 260 allow a single person to lift the storm drain sediment filter 10 from a catch basin 30 when the filter 120 is sufficiently full of sediment to justify replacement or the storm drain sediment filter 10 has been in place for a predetermined amount of time. Oil absorbing inserts (not shown) as are known in the art can be attached to the lifting straps 260, to filter 120 and/or the frame 110, if desired. Most preferably, oil absorbing inserts are attached to tabs 440 (see FIGS. 10-12) provided on an inner side of the filter bag 140. Oil absorbing inserts absorb hydrocarbons that may flow into the catch basin, thereby preventing the same from continuing through the storm drain system.

Figure 4:
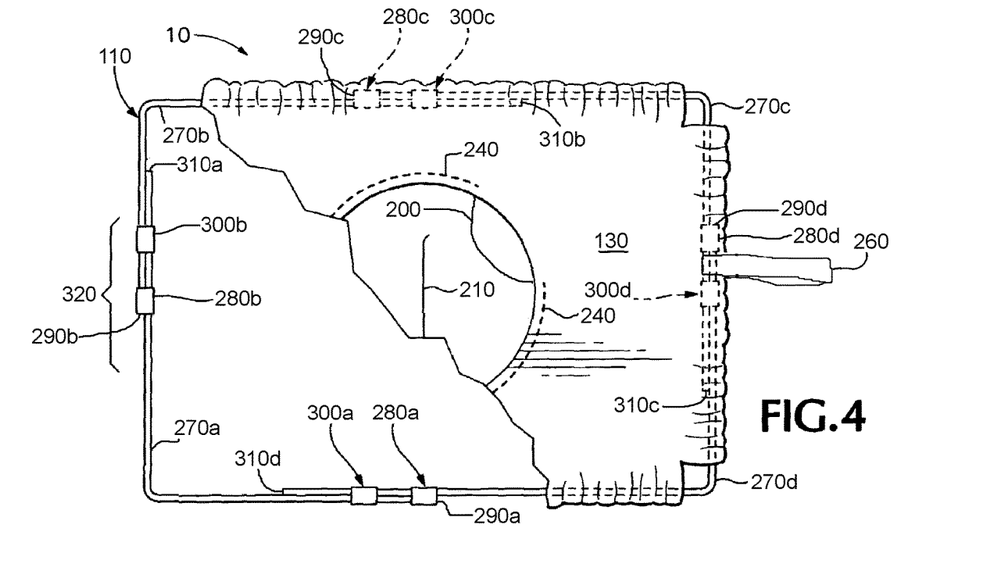
FIG. 4 is a top plan view in partial cutaway of the storm drain sediment filter shown in FIG. 3 in a partially collapsed or contracted condition.

FIG. 4 is a top plan view in partial cutaway of the storm drain sediment filter 10 shown in FIG. 3 in a partially collapsed or contracted condition. As noted above, the frame 110 is adjustable in two dimensions so that both (or either) the width and the length of support frame 110 can be adjusted to allow the frame 110 to be fitted within catch basins of various dimensions. Frame 110 includes four L-shaped rigid members 270a-270d, with members 270b and 270d being first and second adjacent rigid members to member 270a, respectively, and member 270c being the opposed L-shaped rigid member to member 270a. All four of the L-shaped rigid members 270a-270d can be identical, but typically L-shaped rigid members 270a and 270c are identical to each other, with L-shaped rigid members 270b and 270d being identical to each other but of a different length than L-shaped rigid members 270a and 270c.

A first retaining member 280a is fastened at an end portion 290a of the L-shaped rigid member 270a, and at least a second retaining member 300a is fastened to the L-shaped rigid member 270a in a spaced apart relationship with respect to the first retaining member 280a. The spaced apart distance is preferably within a range of from about 0.5" to about 5", with a spacing of about 2" being presently preferred. Additional retaining members can be fastened to the L-shaped rigid members, if desired. But two retaining members per L-shaped rigid member is presently believed to be sufficient. The opposite second end portion 310a of L-shaped rigid member 270a is not provided with any retaining ends. In other words, the dimensions of the L-shaped rigid member 270a do not exceed the dimensions of the L-shaped rigid member 270 when viewed in section at the second end 310a as compared to section views taken through the L-shaped rigid member 270a intermediate the first end portion 290a and second end portion 310a. This is also the case with L-shaped rigid members 270b, 270c and 270d, which are labeled using the same reference numbering system as L-shaped rigid member 270a.

Adjacent L-shaped rigid members overlap with each other in overlapping sections 320 (only one overlapping section 320 is illustrated). For example, in the overlapping section 320 shown in FIG. 4, the second end portion 310a of L-shaped rigid member 270a has passed through the retaining members 280b and 300b fastened to L-shaped retaining member 270b and extends beyond the first end portion 290b of L-shaped rigid member 270b. The retaining members 280b and 300b are not fastened to L-shaped rigid member 270a, but are slidably received thereby. The remaining L-shaped rigid members 270*b*, 270*c*, 270*d* are arranged with respect to adjacent L-shaped rigid members so that there are a total of four overlapping sections such as section 320 are formed, thereby forming a rectangular support frame 110.

The configuration of the overlapping sections 320 permits adjustment of the width and/or length of the frame 110 by movement of the slidably received portion of the L-shaped rigid member with respect to the adjacent L-shaped rigid member to which retaining members have been fastened. An increase in the length and or width dimension of the frame 110 can be accomplished by sliding the slidably received L-shaped member with respect to the adjacent L-shaped member as shown by the arrow 330 in FIG. 6*a*. Similarly, a reduction in the length and or width dimension of the frame 110 can be accomplished by sliding the slidably received L-shaped member with respect to the adjacent L-shaped member as shown by the arrow 340 in FIG. 6*b*.

Figure 5:
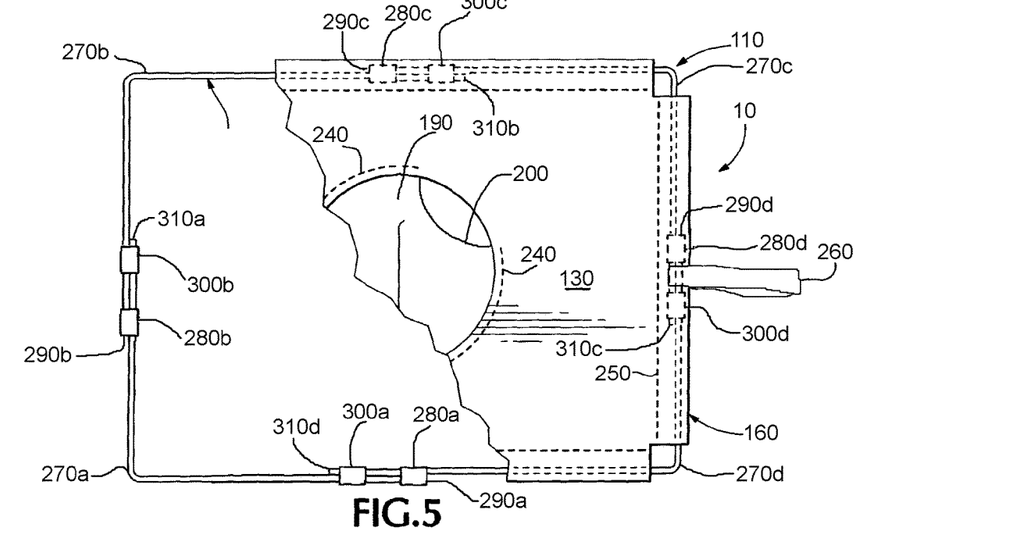
FIG. 5 is a top plan view in partial cutaway of the storm drain sediment filter of FIG. 4 shown in a maximally dimensioned or extended condition.

FIG. 4 shows the filter 120 in a somewhat contracted state and FIG. 5 shows the same filter 120 in a fully expanded state. The loops 160 in the portion 130 limit the maximum degree to which the frame 110 can be expanded in both a length and width direction. This maximum degree is selected such that the second end portions 310*a*, 310*b*, 310*c* and 310*d* are not capable of being withdrawn through retaining members 300*b*, 300*c*, 300*d* and 300*a*, respectively.

The retaining members 280*a*-280*d* and 300*a*-300*d* are preferably of the type used in the bedding industry, and comprise a portion that is fastened to one L-shaped rigid member by a clamping force, but has sufficient spacing to allow the adjacent L-shaped rigid member to slide through. Preferred fasteners of this type have a nylon portion, which contacts the slidably received portion of the L-shaped rigid member. The presently most-preferred fastener is available from Sigma Clips as part number CLP4.

As noted above, no retaining ends are formed or provided at the second ends of the L-shaped rigid members. The elimination of retaining ends helps reduce tearing and other damage caused to the filter portion by prior art devices that include retaining ends.

A side view of a portion of the storm drain sediment filter 10 is shown in section in FIG. 7. In this section, the first end portion 290*b* of L-shaped rigid member 270*b* is visible. First fastener 280*b* has been fastened to L-shaped rigid member 270*b* by a clamping force. L-shaped rigid member 270*a* is slidably received by fastener 280*b* (and also by 300*b*, which is not visible in FIG. 7). The frame is received within loop 160 sewn within the portion 130. Thus, the L-shaped rigid members can be manipulated to lengthen or shorten the frame so as to be able to rest on the horizontal surface of the recess 90 formed at the catch basin inlet 80. As shown in FIG. 2, the portion 130, when used in the catch basin, is dimensioned so that it does not extend past the recess to a point outside the grate 100.

An alternate embodiment useful to fit round catch basin inlets is shown at 10' in FIG. 8. The support frame 110' of filter 10 includes an annular rigid member 270' having first a first end portion 290' and a second end portion 310'. A first retaining member 280' is fastened to the annular rigid member 270' at the first end portion 290', and a second retaining member 300' is fastened to the annular rigid member 270' in a spaced apart relationship with respect to the first retaining member 280'. The spacing is preferably as disclosed above with respect to the first embodiment. No overflow apertures are shown in the illustrated embodiment. But they could be included, if desired.

The portion of the annular rigid member 270' disposed inwardly of the second end portion 310' is slidably received by the retaining members 280' and 300', thus allowing the circumference of the annular ring to be adjusted to fit within the circular catch basin. The maximum dimension of the frame 110' is limited by the dimensions of the portion 130, and no retaining ends are provided on the second end portion 310' of the annular rigid member 270'.

The method of manufacturing a storm drain sediment filter according to the invention is described with reference to FIGS. 9-12. The portion 130 is formed by cutting a single piece of geotextile fabric generally as shown by cutout 350 in FIG. 9. The filter bag is formed by cutting a single piece of textile fabric generally as shown by cutouts 360 and 370. The filter bag may, or may not, be provided with overflow apertures 200. FIG. 10 shows a cutout 360 for a filter bag that includes overflow apertures 200. FIG. 11 shows a cutout 370 for a filter bag that includes overflow apertures in the form of vertical slits, which may be in the form of one or more long slits 450, one or more perforated long slits 450' or one or more combinations of long and perforated slits 450". Initial testing of the use of apertures in the form of vertical slits surprisingly shows that they may be more effective at trapping sediment over a wider range of flows than other apertures known in the art (e.g., squares and scallops), while at the same time reducing the risk of backups. And FIG. 12 shows a cutout 370 for a filter bag that does not include overflow apertures. The filter bag is formed by joining sides 380, 390 to each other using stitch 220 (see FIG. 1), and sides 400, 410 to each other using stitch 210 (see FIG. 2). The remaining perimeter edge 420 is stitched to an opening 150 in cutout 350 using a stitch 240 (see FIG. 3). A frame 110 is laid onto the portion 130 such that it is received between the spaced apart markings 430 shown in FIG. 10. The perimeter edge of the portion 130 is folded over the frame to create a loop 160, and stitched 250 as shown in FIG. 7.

To use a storm drain sediment filter according to the invention, a user first places the storm drain sediment filter over the grate of a catch basin and extends the frame such that it defines a rectangle having the generally the same dimensions as the grate. The grate of the catch basin is then removed, and any dirt and debris on the receiving edge of the catch basin inlet is removed. The storm drain sediment filter is then placed in the catch basin such that the perimeter edge containing the frame rests on the horizontal portion of the catch basin which normally supports the grate. If an oil absorbing insert is to be used, it is attached at this point. The corners of the frame are extended to press against the side of the receiving edge of the catch basin, and the grate is placed on the storm drain sediment filter.

During use, ground water and solids (i.e., sediment) flow through the grate and onto the storm drain sediment filter. Water flows through the geotextile material of the filter portion, which filters out and captures solids, predominantly in the filter bag. Once the storm drain sediment filter has accumulated a sufficient quantity of sediment or has reached an end of life period, it can be replaced by a single person. To do so, the person removes the catch basin grate, grabs the loop handles removes it from the grate for disposal. A new storm drain sediment filter is then placed into the catch basin.

It will be appreciated that the dimensions and materials used to fabricate storm drain sediment filters according to the invention can vary according to the particular situations. Generally speaking, L-shaped rigid members (or annular members) can be made from 8 gauge metal wire. If a stronger frame is required, 6 gauge metal wire can be used. The clips used as retaining members must be dimensioned according to the gauge of the wire used. The geotextile material is preferably an 8:0 ox/yd$^2$ non-woven geotextile material that has been approved for use in the fabrication of storm water drain filters by various regulatory agencies. The lifting straps can be made form nylon webbing. The thread used in the stitching is preferably a polyester thread. However, it would also be possible to join the geotextile fabric together using sonic welding process.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A storm drain sediment filter comprising:
    an adjustable frame comprising four L-shaped rigid members, wherein each L-shaped rigid member has a first end and a second end, wherein a first retaining member is fastened to the first end of each L-shaped rigid member and at least a second retaining member is fastened to each L-shaped rigid member in a spaced apart relationship relative to the first retaining member such that the spacing between the first retaining member and the second retaining member is between about 0.5" and about 5", and wherein the four L-shaped members are arranged to form a rectangular shape such that a portion of each L-shaped rigid member inward of the second end is slidably received by first and second retaining members fastened to an adjacent L-shaped rigid member; and
    a filter comprising a portion that includes a seam that forms a loop that encapsulates the adjustable frame such that the filter spans the adjustable frame;
    wherein no structure is formed on or provided on the L-shaped rigid members which would prohibit the portion of each L-shaped rigid member inward of the second end that is slidably received by first and second retaining members fastened to the adjacent L-shaped rigid member and the second end from being withdrawn from the first and second retaining members fastened to the adjacent L-shaped rigid member by expanding the adjustable frame, and
    wherein the loop that encapsulates the adjustable frame limits a maximum expanded dimension of the adjustable frame such that no second end of any L-shaped rigid member can be withdrawn from the first and second retaining members fastened to the adjacent L-shaped rigid member.

2. The storm drain sediment filter according to claim 1, wherein the first and second retaining members are spaced apart from each other a distance within the range of 1.0" to 3.0".

3. The storm drain sediment filter according to claim 1, wherein the first and second retaining members include a nylon portion that contacts the slidably received L-shaped rigid members.

4. The storm drain sediment filter according to claim 1, wherein the L-shaped rigid members are formed of steel wire having gauge within the range of from 6 gauge to 8 gauge.

5. The storm drain sediment filter according to claim 1, wherein the filter is fabricated from non-woven geotextile material.

6. The storm drain sediment filter according to claim 1, wherein the filter further comprises lifting straps.

7. A storm drain sediment filter comprising:
    an adjustable frame comprising an annular rigid member having a first end and a second end, wherein a first retaining member is fastened to the first end of the annular rigid member and at least a second retaining member is fastened to the annular rigid member in a spaced apart relationship relative to the first retaining member such that the spacing between the first retaining member and the second retaining member is between about 0.5" and about 5", and wherein a portion of the annular rigid member inward of the second end is slidably received by first and second retaining members fastened to the annular rigid member; and
    a filter comprising a portion that includes a seam that forms a loop that encapsulates the adjustable frame such that the filter portion spans the adjustable frame;
    wherein no structure is formed on or provided on the annular rigid member which would prohibit the portion inward of the second end that is slidably received by the first and second retaining members fastened to the annular rigid member and the second end from being withdrawn from the first and second retaining members fastened to the annular rigid member by expanding the adjustable frame, and
    wherein the loop that encapsulates the adjustable frame limits a maximum expanded dimension of the adjustable frame such that the second end of annular rigid member cannot be withdrawn from the first and second retaining members fastened to the annular rigid member.

8. The storm drain sediment filter according to claim 7, wherein the first and second retaining members are spaced apart from each other a distance within the range of 1.0" to 3.0".

9. The storm drain sediment filter according to claim 7, wherein the first and second retaining members include a nylon portion that contacts the slidably received portion of the annular rigid member.

10. The storm drain sediment filter according to claim 7, wherein the annular rigid member is formed of steel wire having gauge within the range of from 6 gauge to 8 gauge.

11. The storm drain sediment filter according to claim 7, wherein the filter is fabricated from non-woven geotextile material.

12. The storm drain sediment filter according to claim 7, wherein the filter further comprises lifting straps.

* * * * *

UNITED STATES PATENT AND TRADEMARK OFFICE
CERTIFICATE OF CORRECTION

PATENT NO. : 10,786,765 B2  
APPLICATION NO. : 16/532653  
DATED : September 29, 2020  
INVENTOR(S) : Edward L. DiLalla et al.

Page 1 of 1

It is certified that error appears in the above-identified patent and that said Letters Patent is hereby corrected as shown below:

In the Claims

In Column 8, Line 25, Claim 7 delete "portion" between --"filter" and "spans"--

Signed and Sealed this  
Eighth Day of December, 2020

Andrei Iancu  
*Director of the United States Patent and Trademark Office*